United States Patent
Manfrin

[19]

[11] Patent Number: 6,149,186
[45] Date of Patent: Nov. 21, 2000

[54] BADGE-PLATE AND COUNTERPLATE UNIT TO APPLY EMBLEMS AND THE LIKE ON THE FRONT WALL OF THE HOUSING FOR AIR BAG DEVICES, IN CARS AND OTHER MOTORVEHICLES

[75] Inventor: Marino Manfrin, Binasco, Italy

[73] Assignee: Bomisa Bottoni Minuterie S.p.A., Milan, Italy

[21] Appl. No.: 09/334,603

[22] Filed: Jun. 17, 1999

[51] Int. Cl.$^7$ .................................................. B60R 21/16
[52] U.S. Cl. ........................................ 280/728.2; 280/731
[58] Field of Search ............................. 280/727, 728.2, 280/728.3, 731

[56] References Cited

U.S. PATENT DOCUMENTS

| | | | |
|---|---|---|---|
| 5,678,849 | 10/1997 | Davis | 280/728.3 |
| 5,678,851 | 10/1997 | Saito et al. | 280/731 |
| 5,775,721 | 7/1998 | Grout | 280/727 |
| 6,047,984 | 4/2000 | Preisler et al. | 280/728.2 |
| 6,053,526 | 4/2000 | Preisler et al. | 280/728.2 |

*Primary Examiner*—Kenneth R. Rice
*Attorney, Agent, or Firm*—Young & Thompson

[57] ABSTRACT

Badge-plate and counterplate unit to safely apply emblems and the like on the front wall of the housing for air bag devices, in cars and other motorvehicles, and particularly onto the portion of said wall opening up, at the centre of the steering wheel, when the air bag device starts to operate. In said unit, the badge-plate (1) consists of a ring (4), formed by coining from a metal sheet in one piece with at least two projecting extruded pins (6), and of a disk (5) carrying the emblem (3) and the periphery of which is shaped so as to be steadily coupled with said ring (4). Said pins (6) have a conical cavity (8) at their free end and the counterplate comprises holes in correspondence of said pins (6), so as to be steadily associated to the badge-plate (1)—after having interposed between them the wall housing the air bag device—by riveting with a caulking the end of said pins (6) of the badge-plate onto the edge of said holes of the counterplate.

11 Claims, 1 Drawing Sheet

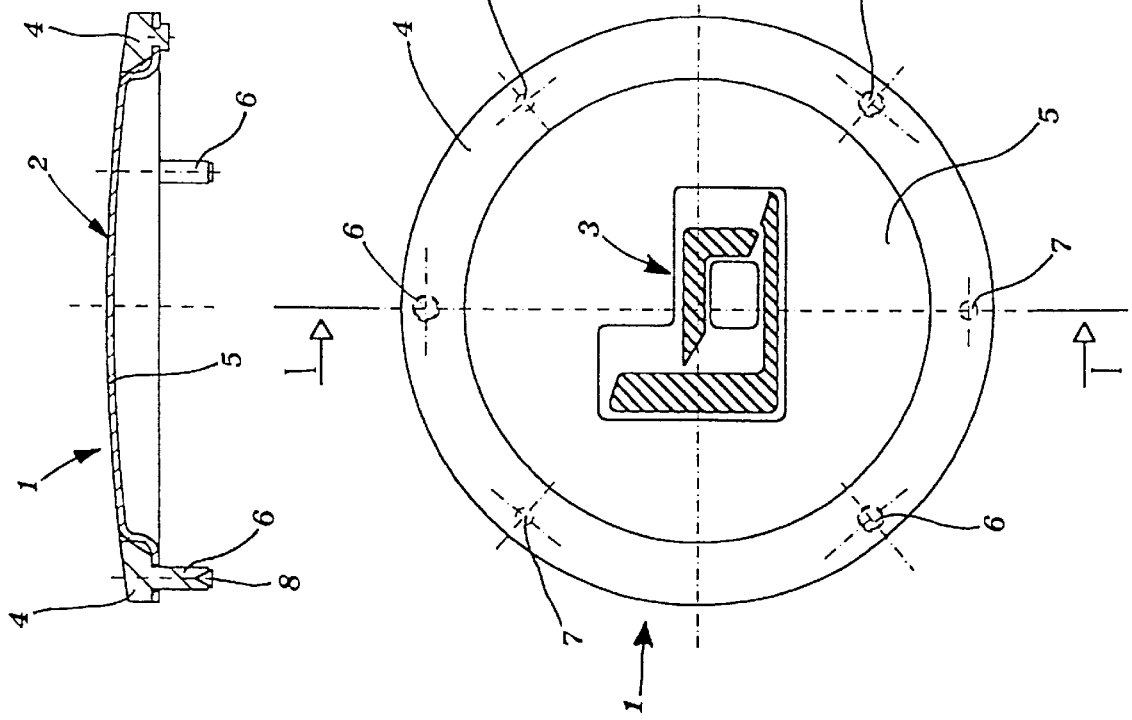

BADGE-PLATE AND COUNTERPLATE UNIT TO APPLY EMBLEMS AND THE LIKE ON THE FRONT WALL OF THE HOUSING FOR AIR BAG DEVICES, IN CARS AND OTHER MOTORVEHICLES

BACKGROUND OF THE INVENTION

It is a known custom to apply at the centre of the steering wheel of cars and other motorvehicles an emblem, or like (usually the badge of the car factory or a logo relating to the type of motorvehicle), reproduced onto a badge-plate.

In the past, said application has never created any kinds of problems and has been accomplished in the most different ways, always using besides very plain and simple means.

Things have been changing with the more and more frequent introduction, in motorvehicles, of the so-called "air bag" safety devices, which are usually positioned into a housing associated to the vehicle steering wheel.

As known, the central portion of the front wall of said housing—usually consisting of reinforced plastic material—is meant to brake and open up with a violent blow at the moment in which the air bag device starts to operate: for this purpose, an undercut facilitating breakage is provided on three sides of a portion of said wall, which portion thus gets lifted—separating from said three sides and remaining anchored with its fourth side to the housing—to allow the outlet of the air bag.

Upon breaking, said wall portion and the portions connected thereto or any elements applied thereon—as for example the badge-plate usually positioned at the centre of the steering wheel—are sujected to very high stresses, mainly determined by the strong accelerations developing in opposite senses. Such stresses may then easily lead the badge-plate to break off from the wall portion just opened up and, though light and of small dimensions, said badge-plate could turn into a dangerous bullet.

To avoid risks of this kind, the use of badge-plates at the centre of steering wheels equipped with air bag devices is now-a-days allowed only if such plates are applied with a system tested so as to guarantee—when the air bag device starts to operate—that the badge-plate remains anchored to the wall housing the device, and to positively exclude its breaking off from said wall.

The problem has been faced and efficiently solved by the Applicant in the FR-9604121, which supplies a unit consisting of a badge-plate and a counterplate, wherein the badge-plate is formed by coining from a metal sheet, in one piece with at least a central projecting extruded pin having a conical cavity at its free end, and wherein the counterplate comprises a hole in correspondence of said pin and is steadily associated to the badge-plate—after having interposed between them the wall housing the air bag device—by riveting with a caulking the end of said pin of the badge-plate onto the edge of said hole of the counterplate.

SUMMARY OF THE INVENTION

The present invention now supplies a different solution, providing a unit which, besides being very efficient and easy to mount, also offers considerable advantages from the economic point of view.

The unit according to the present invention—of the type described heretofore—is characterized in that, the badge-plate is formed by the combination of a metal ring, provided with at least two of said projecting extruded pins, with a disk carrying the emblem and the periphery of which is shaped so as to be steadily coupled with said ring, the counterplate having holes in correspondence of said pins.

BRIEF DESCRIPTION OF THE DRAWINGS

The invention is now described in further detail, with reference to the accompanying drawings, in which:

FIG. 1 is a part section view (along the line I—I of FIG. 2) of a badge-plate according to the invention;

FIG. 2 is a top view of the badge-plate of FIG. 1; and

FIG. 3 illustrates the coupling between the disk and the ring forming part of the badge-plate of FIG. 1.

DESCRIPTION OF THE PREFERRED EMBODIMENT

The badge-plate and counterplate unit of the present invention consists in known manner of a badge-plate 1, carrying onto a face 2 thereof—normally slightly convex, as shown—an emblem 3, and of a counterplate (not shown).

According to the invention, the badge-plate 1 is formed by the combination of a metal ring 4 with a disk 5. The ring 4 comprises three projecting pins 6, in one piece therewith, and three dowels 7 (shown in dashes only in FIG. 2) to engage into the wall housing the air bag device. The pins 6 have a conical cavity 8 at their free end. The periphery of the disk 5 is shaped so as to mate—as clearly illustrated in FIG. 3—with the ring 4, whose projecting pins 6 are apt to cross corresponding holes 9 formed into the periphery of said disk 5.

When being mounted, the unit according to the present invention is fitted—likewise as in the FR-9604121—into a seat suitably provided in the portion of the front wall of the steering wheel housing the air bag device installed on the motorvehicle, said portion being substantially at the centre of the steering wheel.

As known, said wall portion is delimited on three sides by under-cuts facilitating breakage, in correspondence of which, as the air bag device starts to operate, the housing breaks off and then opens up to let out said device.

Said wall portion is provided at the centre with three holes, into which are fitted—to apply the badge-plate unit of the present invention—the projecting pins 6 of the ring 4, after having associated to this latter the disk 5. The face 2 of the badge-plate 1, carrying the emblem 3, is positioned outwardly of said wall portion; then, in known manner, the counterplate is applied inwardly of said wall portion by introducing into its holes the pins 6 of the badge-plate 1. The ends of said pins 6 are finally riveted onto the edge of the holes of the counterplate, carrying out a caulking with a suitable tool. The whole unit is thus anchored in a highly steady manner to the wall portion housing the air bag device of the motorvehicle.

Besides allowing a positively safe application, the badge-plate and counterplate unit of the present invention involves a great simplicity of construction and mounting, while considerably limiting the costs by reducing the amount of special high-quality material having to be used. The metal may in fact be simply used to form the ring 4, since the disk 5 can be made—as well as of thin metal—also of less costly materials such as, for example, leather or synthetic plastic material, fabric, wood, cork or rubber. Nevertheless, in a high-quality production, the disk 5 is made of aluminum, stainless steel, brass or titanium, and the emblem 3 is applied thereon by enameling.

It is evident that the shapes of the badge-plate and counterplate could be chosen at will, and that the construction details could differ from those described heretofore, while keeping within the protection scope of the present invention. For example, the ring 4—instead of being provided with three projecting pins 6, as shown on the drawings—could comprise only two diametrally opposite projecting pins 6.

What is claimed is:

1. Badge-plate and counterplate unit to safely apply emblems and the like on the front wall of the housing for air bag devices, in cars and other motorvehicles, and particularly onto the portion of said wall opening up, at the centre of the steering wheel, when the air bag device starts to operate, said unit consisting of a badge-plate, formed by coining from a metal sheet in one piece with at least a central projecting extruded pin having a conical cavity at its end, and of a counterplate comprising at least a hole in correspondence of said pin, the counterplate being steadily associated to the badge-plate—after having interposed between them the wall housing the air bag device—by riveting with a caulking the end of said pin of the badge-plate onto the edge of said hole of the counterplate, characterized in that the badge-plate (1) is formed by the combination of a metal ring (4), provided with at least two of said projecting extruded pins (6), with a disk (5) carrying the emblem (3) and the periphery of which is shaped so as to be steadily coupled with said ring (4), the counterplate having holes in correspondence of said pins (6).

2. Unit as in claim 1), wherein the shaped disk (5) is coupled with said ring (4) so as to be positioned between the same and the wall housing the air bag device.

3. Unit as in claim 1), wherein said disk (5) is of metallic material, the emblem (3) being applied thereon by enameling.

4. Unit as in claim 1), wherein said disk (5) is of aluminum.

5. Unit as in claim 1), wherein said disk (5) is of leather.

6. Unit as in claim 1), wherein said disk (5) is of wood or cork.

7. Unit as in claim 1), wherein said disk (5) is of rubber.

8. Unit as in claim 1), wherein said disk (5) is of fabric.

9. Unit as in claim 1), wherein said disk (5) is of synthetic plastic material.

10. Unit as in claim 1), wherein said ring (4) is provided with two diametrally opposite projecting pins (6) and with at least one dowel (7) to engage into the wall housing the air bag device.

11. Unit as in claim 1), wherein said ring (4) is provided with three evenly spaced projecting pins (6) and with three dowels (7) to engage into the wall housing the air bag device.

* * * * *

UNITED STATES PATENT AND TRADEMARK OFFICE
CERTIFICATE OF CORRECTION

PATENT NO. : 6,149,186
DATED : November 21, 2000
INVENTOR(S) : Marino MANFRIN

It is certified that error appears in the above-indentified patent and that said Letters Patent is hereby corrected as shown below:

Title page, insert Item [30] as follows:

--[30]   Foreign Application Priority Data

June 18, 1998   [IT]         Italy         MI98U000423.--

Signed and Sealed this

Eighth Day of May, 2001

*Attest:*

NICHOLAS P. GODICI

*Attesting Officer*   *Acting Director of the United States Patent and Trademark Office*